US011465247B2

(12) United States Patent
Binek et al.

(10) Patent No.: US 11,465,247 B2
(45) Date of Patent: Oct. 11, 2022

(54) FUEL FEED PASSAGES FOR AN ATTRITABLE ENGINE

(71) Applicant: Raytheon Technologies Corporation, Farmington, CT (US)

(72) Inventors: Lawrence A. Binek, Glastonbury, MN (US); David W. Morganson, Marlborough, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 563 days.

(21) Appl. No.: 16/448,801

(22) Filed: Jun. 21, 2019

(65) Prior Publication Data

US 2020/0398386 A1 Dec. 24, 2020

(51) Int. Cl.
*B33Y 80/00* (2015.01)
*B23P 15/26* (2006.01)
(Continued)

(52) U.S. Cl.
CPC ............ *B23P 15/26* (2013.01); *F28F 9/0265* (2013.01); *B33Y 80/00* (2014.12); *F28D 2021/0021* (2013.01); *F28D 2021/0026* (2013.01)

(58) Field of Classification Search
CPC ...... F23R 3/00; F23R 3/06; F23R 3/32; F23R 3/34; F23R 3/54; F23R 3/286; F23R 3/346; F23R 3/283; F02C 7/22; F02C 7/222; B64D 13/00; B64G 1/50; B21D 53/02; B23P 15/26; F28F 9/0265; B33Y 80/00; F28D 2021/0021; F28D 2021/0026; B22F 10/20; B22F 5/009; F05D 2230/22; F05D 2230/234; F05D 2230/31; F05D 2250/82; F05D 2260/80; F01D 25/24; Y02P 10/25; Y02T 50/60
(Continued)

(56) References Cited

U.S. PATENT DOCUMENTS 5,297,391 A * 3/1994 Roche ........................ F23R 3/20
60/761
5,727,378 A * 3/1998 Seymour ..................... F02C 3/09
60/804
(Continued)

FOREIGN PATENT DOCUMENTS

CN 108590859 A 9/2018
EP 1197290 A2 * 4/2002 .............. B23P 6/007
(Continued)

OTHER PUBLICATIONS

Extended European Search Report for EP Application No. 20180539.7, dated Nov. 19, 2020, pp. 6.

*Primary Examiner* — Lawrence Averick
(74) *Attorney, Agent, or Firm* — Getz Balich LLC

(57) ABSTRACT

An additively manufactured attritable engine includes a compressor section, a combustion section, a turbine section, and an engine case wall, which surrounds the compressor section, the combustion section, and the turbine section. The engine case wall includes a first cavity embedded in the engine case wall that defines an injector that is in fluid communication with the combustion section. The engine case wall includes a second cavity embedded within the engine case wall and defines a fuel feed passage that is in thermal communication through the exterior surface of the engine case wall.

20 Claims, 3 Drawing Sheets

(51) Int. Cl.
*F28F 9/02* (2006.01)
*F28D 21/00* (2006.01)

(58) Field of Classification Search
USPC .......... 29/428; 415/121.2; 60/739, 752, 799, 60/722, 39.08, 39.092, 39.83, 748, 732
See application file for complete search history.

(56) References Cited

U.S. PATENT DOCUMENTS

| | | | | |
|---|---|---|---|---|
| 8,720,205 B2* | 5/2014 | Lugg | .......... | F02K 3/00 60/767 |
| 9,062,609 B2* | 6/2015 | Mehring | .......... | F02C 7/22 |
| 9,803,498 B2 | 10/2017 | Jewess et al. | | |
| 10,184,403 B2* | 1/2019 | McCaldon | .......... | F23R 3/12 |
| 10,309,312 B2* | 6/2019 | Brocard | .......... | F02C 9/263 |
| 10,378,774 B2* | 8/2019 | Hu | .......... | F23R 3/283 |
| 10,632,536 B2* | 4/2020 | Care | .......... | B22F 1/0003 |
| 11,136,901 B2* | 10/2021 | Binek | .......... | F01D 25/005 |
| 2007/0126292 A1* | 6/2007 | Lugg | .......... | F01D 5/03 310/11 |
| 2013/0174559 A1* | 7/2013 | Mehring | .......... | F23R 3/06 60/737 |
| 2013/0219719 A1* | 8/2013 | Sisk | .......... | F02K 9/52 29/890.1 |
| 2015/0113994 A1* | 4/2015 | Hu | .......... | F23R 3/283 60/759 |
| 2016/0047315 A1* | 2/2016 | McCaldon | .......... | F23R 3/28 60/776 |
| 2017/0225230 A1* | 8/2017 | Care | .......... | C04B 35/6455 |
| 2018/0209344 A1* | 7/2018 | Brocard | .......... | F02C 7/224 |
| 2020/0332719 A1* | 10/2020 | Binek | .......... | F23R 3/286 |
| 2020/0362724 A1* | 11/2020 | Binek | .......... | F01D 25/005 |

FOREIGN PATENT DOCUMENTS

| | | | | |
|---|---|---|---|---|
| EP | 1197290 B2 * | 6/2014 | ......... | B23K 35/3046 |
| EP | 3730765 A1 | 10/2020 | | |

\* cited by examiner

FUEL FEED PASSAGES FOR AN ATTRITABLE ENGINE

The present application is related to co-pending application entitled "COOLING FUEL INJECTOR SYSTEM FOR AN ATTRITABLE ENGINE" filed on the same date as the present application by inventors Lawrence Binek and David Morganson. This application and the co-pending application are assigned to a common assignee.

BACKGROUND

The present disclosure relates generally to attritable aircraft engines. More specifically, this disclosure relates to cooling a fluid dispensing system within an attritable aircraft engine.

Attritable aircraft can include, for example, Unpiloted (or Unmanned) Aerial Vehicles (UAVs) and expendable turbojet systems for guided munitions, missiles, and decoys. Attritable aircraft are generally designed as a limited lifetime vehicle, which can be as short as a single use or single mission vehicle. As such, many components and features common in traditional piloted aircraft are unnecessary, such as, a fuel dispensing system within a traditional aircraft engine, which can have more than 30 individual parts, each requiring assembly. Even in the realm of attritable engines, conventional fuel rails can have more than 10 individual parts, which need to be brazed together, which is expensive and time consuming.

Furthermore, conventional fluid dispensing devices may be heavy, are difficult to package, and because of the many operating parts may be expensive to maintain and/or repair. There exist needs in various industries to reduce the number of manufactured parts for fluid dispensing devices, thereby providing more robust and simpler designs, which requires less maintenance, reduces manufacturing time and costs, reduces weight, and simplifies packaging.

SUMMARY

An additively manufactured attritable engine includes a compressor section, a combustion section, a turbine section, and an engine case wall, which surrounds the compressor section, the combustion section, and the turbine section. The engine case wall includes a first cavity embedded in the engine case wall that defines an injector that is in fluid communication with the combustion section. The engine case wall includes a second cavity embedded within the engine case wall and defines a fuel feed passage that is in thermal communication through the exterior surface of the engine case wall.

A method of testing a fluid dispensing system in an attritable engine that has a fuel line and an N number of fuel feed passages includes applying cooling to an exterior surface adjacent to each fuel feed passage for each of (N−1) injectors and inducing a phase change to a flow test fluid in each of (N−1) fuel feed passages, which prevents flow through each of (N−1) injectors. The method includes measuring a flow rate of the flow test fluid through a single unblocked injector.

DETAILED DESCRIPTION

An attritable engine with an integrally built fuel dispensing system simplifies manufacturing. Even so, an attritable engine can leverage additive manufacturing techniques to improve various aspects of the limited-life engine. For example, additive manufacturing allows the assembly details to be unitized and, simultaneously permits integration of many complex performance-enhancing features. The additively manufactured engine reduces the time to delivery to the customer and lowers the overall production costs of the unit.

However, an integrally built fuel system in an attritable engine limits accessibility for inspection and testing post-manufacture. Typically, gas turbine engines have more than one fuel injector per engine, which complicates determining whether one or more individual injectors are clogged or otherwise faulty using routine techniques. For example, although CT scanning (Computed Tomography) can be used to inspect an attritable engine, CT scanning is very time consuming and costly. As such, CT scanning is not amenable to inspection of every manufactured attritable engine. An attritable engine with fuel feed passages and a method to individually isolate and flow test each injector using the fuel feed passages are disclosed herein.

Figure 1:
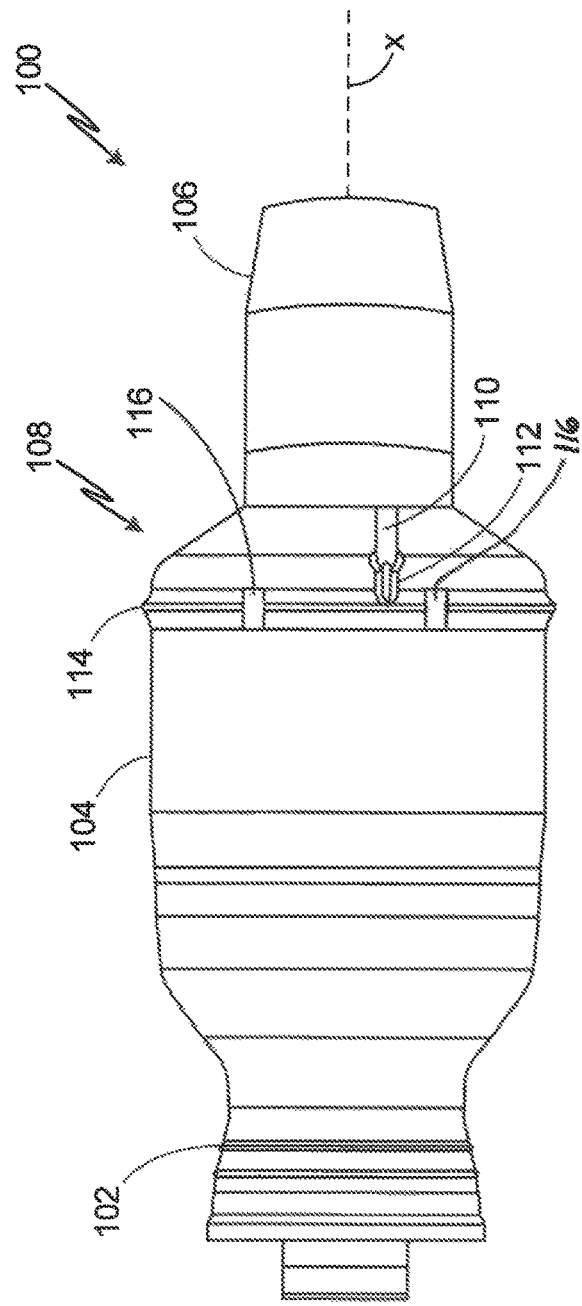
FIG. 1 is a side view of an attritable engine.
Figure 2:
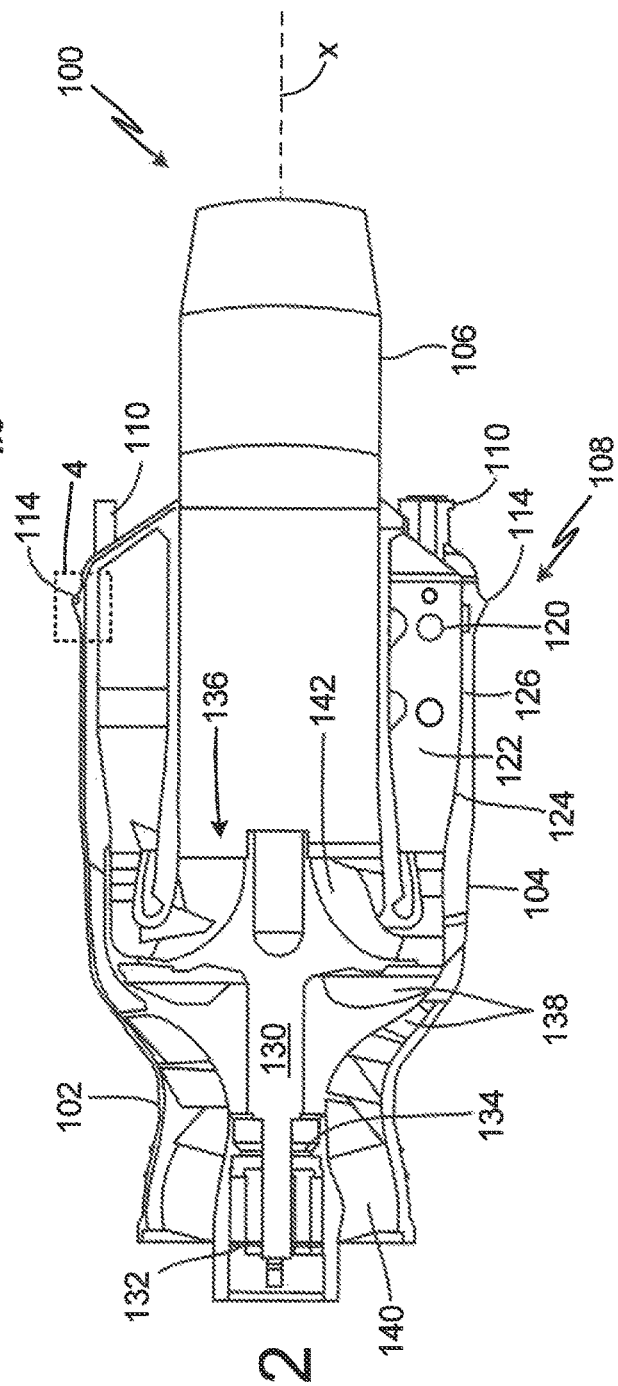
FIG. 2 is a cross-sectional view of the attritable engine.

FIGS. 1 and 2 will be discussed together. FIG. 1 is a side view of an attritable engine. FIG. 1 shows attritable engine 100 including forward engine casing 102, rearward engine casing 104, exhaust casing 106, fluid distribution system 108, fuel inlet 110, fuel manifold 112, fuel line 114, fuel feed passages 116, and axis of rotation X. FIG. 2 is a cross-sectional view of attritable engine 100 including forward engine casing 102, rearward engine casing 104, exhaust casing 106, fluid distribution system 108, fuel inlet 110, fuel line 114, combustor 122, combustor liner 124, air channel 126, rotor 130, bearings 132 and 134, rotor system 136, compressor blades 138, air inlet 140, turbine blades 142, and axis of rotation X.

Forward engine casing 102 encases a compressor section of attritable engine 100 and is connected to rearward engine casing 104, which encases combustion and turbine sections of attritable engine 100. Exhaust casing 106 is connected to rearward engine casing 104, opposing forward engine casing 102.

Rearward engine casing 110 has fluid distribution system 108 including fuel inlet 110, fuel manifold 112, fuel line 114, and fuel feed passage 116. Although only two feed passages 116 are shown, four other feed passages are present and circumferentially related around axis of rotation X and obscured in FIG. 1 by rearward engine casing 104.

Fuel inlet 110 is coupled to a fuel source such as a fuel tank. Fuel inlet 110 is configured to deliver fuel to fuel manifold 112, which is connected to and delivers fuel to fuel line 114. The fuel exits fuel line 114 and enters fuel feed passage 116. The fuel exits fuel feed passage 116 and enters injector 120, which delivers the fuel to combustor 122 defined by combustor wall 124. The fuel can be aerated by air from air channel 126 prior to delivery into combustor 122, aerated in combustor 122, or aerated both prior to and during delivery to combustor 122.

Combusted fuel exits combustor 122 and turns rotor 130, which is received in bearings 132 and 134. Rotor system 136 includes compressor blades 138, air inlet 140, and turbine blades 142. Air enters air inlet 140 and is compressed by compressor blades 138. Compressed air enters combustor 122 where the compressed air is combusted with fuel from injector 120. The combusted air from combustor 122 enters and turns turbine blades 142, which are attached to rotor 130, circumferentially around rotational axis X, generating power. The air exits out of exhaust casing 106.

Figure 3:
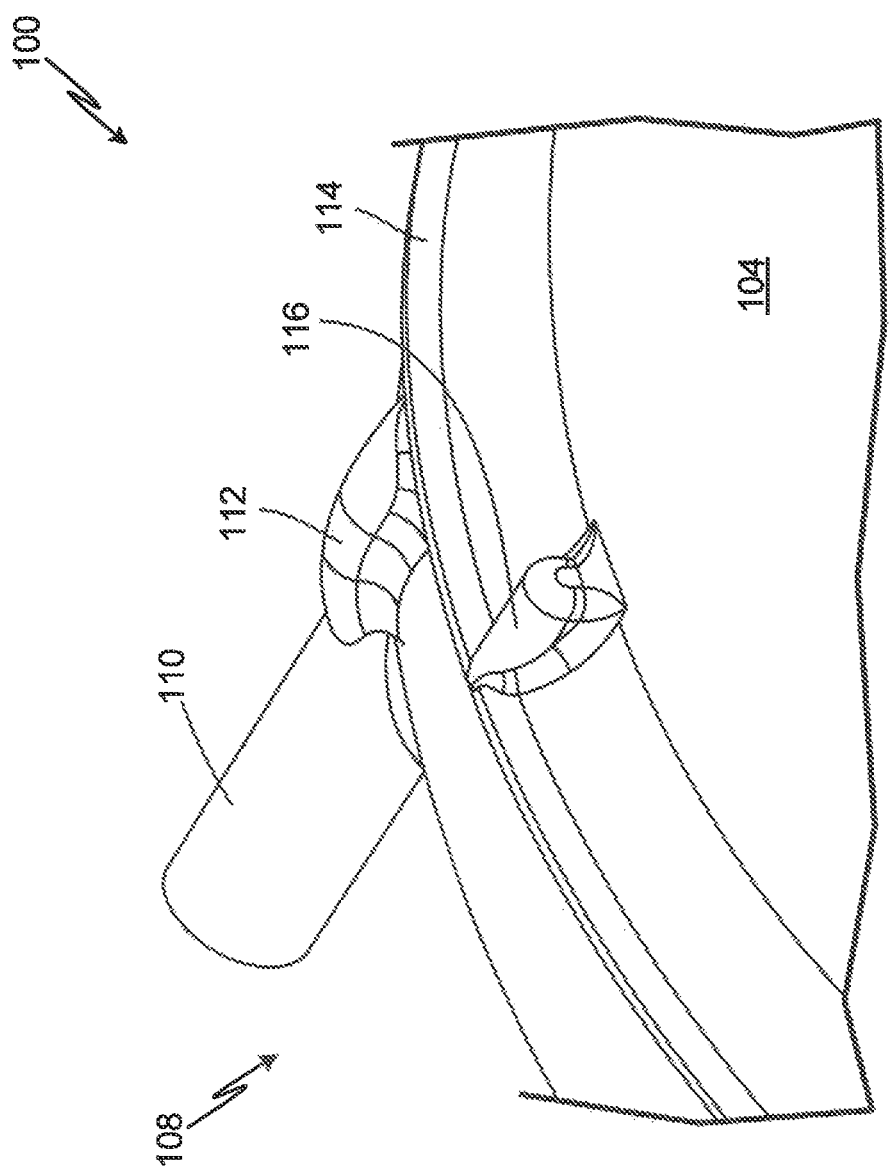
FIG. 3 is a perspective view of the attritable engine with a fuel feed passage.
Figure 4:
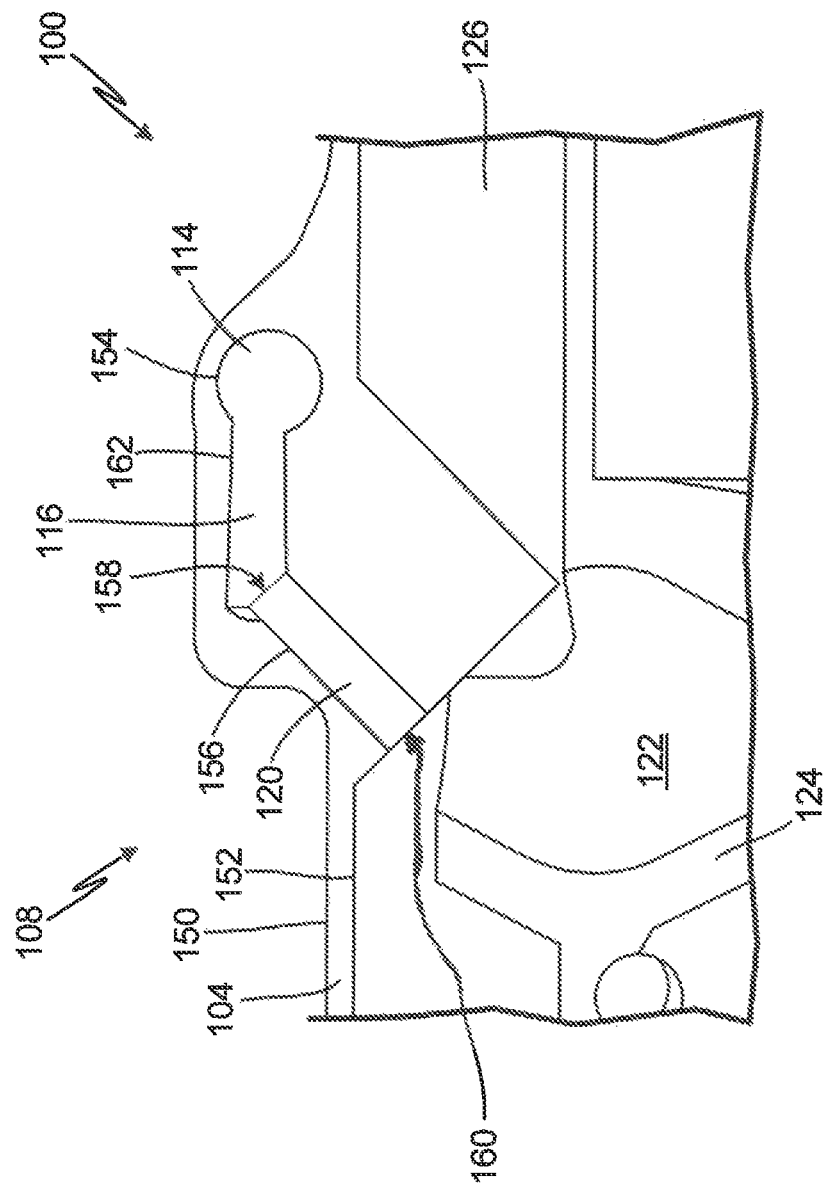
FIG. 4 is a sectional region view of an injector with a fuel feed passage shown in FIG. 2.

FIGS. 3 and 4 will be discussed together. FIG. 3 is a perspective view of the attritable engine with a fuel feed passage. FIG. 3 shows attritable engine 100 including rearward engine casing 104, fluid dispensing system 108, fuel inlet 110, fuel manifold 112, fuel line 114, and fuel feed passage 116. FIG. 4 is a sectional region view of an injector with a fuel feed passage shown in FIG. 2. FIG. 4 shows attritable engine 100 including rearward engine casing 104, fluid dispensing system 108, fuel line 114, fuel feed passage 116, injector 120, combustor 122, combustor wall 124, air channel 126, exterior surface 150, interior surface 152, fuel line wall 154, injector wall 156, injector inlet 158, injector outlet 160, and fuel feed passage wall 162.

Attritable engine 100 includes rearward engine casing 104, which has exterior surface 150 and interior surface 152. Attritable engine 100 also includes fluid dispensing system 108 manufactured integral and conformal with rearward engine casing 104. Fluid dispensing system 108 includes fuel inlet 110, fuel manifold 112, fuel line 114, injector 120, injector inlet 158, injector outlet 160, and fuel feed passage 116. Rearward engine casing 104 includes a plurality of cavities. Fuel line 114 is a cavity within rearward engine casing 104 defined by fuel line wall 154. Injector 120 is a cavity within rearward engine casing 104 and is defined by injector wall 156. Fuel feed passage 116 is a cavity within rearward engine casing 104 and is defined by fuel feed passage wall 162.

Rearward engine casing 104 circumferentially surrounds rotor 130 along its rotational axis X. Injector 120 is attached to fuel feed passage 116 at injector inlet 158. Injector 120 extends at an acute angle from rearward engine casing 104 in an axial direction toward rotor 130's rotational axis X and away from exterior surface 150. Injector 120 is integral and conformal with rearward engine casing 104 and extends through and is defined by rearward engine casing 104.

Fluid distribution system 108 operates by fuel entering fuel inlet 110, which is configured to receive fuel from a fuel source such as a fuel tank and deliver fuel to fuel manifold 112. The fuel enters fuel line 114 from fuel manifold 112 and is delivered to fuel feed passage 116, which delivers the fuel to injector 120 at injector inlet 158. The fuel can be partially aerated in fuel line 114. For example, fuel line 114 can have numerous holes where air from air channel 126 may enter and mix with the fuel. The fuel travels through injector 120 and exits at injector outlet 160 where the fuel is dispensed into combustor 122. Injector outlet 160 of injector 120 is configured to deliver fuel, which can be aerated, to combustor 122. The fuel entering combustor 122 can be further aerated and is combusted.

Fuel feed passages 116 are built integral and conformal with rearward engine casing 104. In one embodiment, fuel feed passages 116 extend laterally with exterior surface 150 and are substantially parallel with exterior surface 150. Alternatively, fuel feed passages 116 can extend at an acute angle from exterior surface 150 toward axis of rotation X of rotor 130.

Fuel feed passages 116 are in thermal communication with exterior surface 150. Fuel feed passages 116 are close enough to exterior surface 150 to be in thermal communication with exterior surface 150, but not close enough to reduce the structural integrity of rearward engine casing 104, injector 120, or fuel feed passages 116 compared to an attritable engine without any fuel feed passages. In other words, fuel feed passages 116 have sufficient structural integrity to withstand the pressures and temperatures in an attritable engine under load.

An attritable engine can have more than one injector per engine. After the attritable engine has been manufactured, the injectors can be flow tested to ensure the stringent flow requirements are met to operate the gas turbine engine under load. However, it is desirable to flow test each injector one at a time and, as such, desirable to temporarily block the flow of the other injectors present in the attritable engine.

The fuel feed passage system of attritable engine 100 temporarily blocks the flow to the other injectors in the attritable engine by freezing a flow test fluid in each of the other fuel feed passages. A flow test fluid is injected into fuel line 114 and enters fuel feed passage 116. Cooling is then applied to exterior surface 150 adjacent to fuel feed passage 116. The applied cooling can be in the form of a solid, liquid, or a gas such as, for example, ice, water, salt water, a water-alcohol mixture, carbon dioxide gas, or nitrogen gas. As cooling is applied heat is absorbed from rearward engine casing 104, which in turn absorbs heat from a flow test fluid present in fuel feed passage 116. The applied cooling is cold enough to induce a phase change in the testing fluid to a solid. The solid testing fluid prevents any further flow through injector 120.

Cooling is applied to fuel feed passages 116 for all the injectors of attritable engine 100, except for one. For example, an attritable engine with an N number of injectors would have (N−1) fuel feed passages cooled, which prevents flow through the corresponding (N−1) injectors. That leaves one injector available for flow testing. The flow rate can be measured of a test fluid such as, for example, water or fuel. The injector under test can be blocked by cooling exterior surface 150 adjacent to fuel feed passage 116 in order to induce a phase change in the flow test fluid present in the fuel feed passage. Next, one of the (N−1) injectors can be unblocked by allowing the flow test fluid to undergo another phase change. Either heating can be applied to the exterior surface 150 adjacent to fuel feed passage 116 or ambient conditions can be allowed to warm up the flow test fluid by simply removing the cooling from exterior surface 150 adjacent to fuel feed passage 116. Subsequently, the one of the (N−1) injectors can be flow tested. This process can be repeated until all N injectors have been fluidically isolated and flow tested.

Notably, water can be used both as the cooling fluid and the flow test fluid. For example, fast moving water, a suitable mixture of salt water, or a suitable mixture of water and alcohol do not freeze even below 0° C. (32° F.) and, as such, can induce a phase change of water in the fuel feed passage.

Measured flow rates within tolerance requirements indicate a successful manufacture, whereas, measured flow rates outside of tolerance requirements may indicate the injector was not manufactured correctly. For example, a metallic powder used during an additive manufacturing process may not be sintered completely or properly removed after one or more additive manufacturing building steps and, as such, obstruct the flow path through the injector.

Alternatively, a gas, such as Argon, can be used as the flow test fluid. A gas passing through a restricted opening, such as an injector, induces an acoustic vibration. The pitch of the acoustic vibration changes as the restriction is enlarged or narrowed. Measuring the pitch of the acoustic vibration may indicate a successful build, an improper build, or a plugged injector.

Attritable engine 100 is built using additive manufacturing techniques and has fluid dispensing system 108 manufactured integral with the engine case wall. Specifically, the engine case wall is built up in a layer-by-layer process in an axial direction toward the central rotor's rotational axis and has a plurality of cavities. The additively manufactured engine case wall results in a geometry for the injector that meets the stringent tolerance requirements of the attritable engine and includes cooling holes to allow sequential flow testing of individual injectors within the attritable engine.

Attritable engine 100 can be additively manufactured using any metal or alloy that can tolerate the high temperature and pressure environment of an aircraft combustion engine for the expected useable life of the vehicle, such as, for example, Inconel® 625 or other nickel alloys or alloys of nickel, chromium, and iron. However, guided munitions, missiles, and decoys are designed as single use vehicles and can have a maximum useable life of 10 hours. Heat protection that extends the useable life of the vehicle beyond 10 hours can unnecessarily add labor and expense to the manufacturing of such an engine. On the other hand, some UAVs can be designed to perform multiple missions and more heat protection may be desirable. A specific metal or alloy with or without additional treatments to provide heat protection can be chosen with such considerations in mind. For example, a thermal barrier layer or coating can be applied to the metal or alloy to extend the useful life of the attritable engine.

Providing fuel feed passages adjacent to and in thermal communication with the exterior surface of an attritable engine allows each injector to be fluidically isolated and flow tested after the attritable engine has been manufactured. This testing process is much faster and less expensive than conventional testing techniques such as CT scanning.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An engine comprising:
a compressor section;
a combustion section;
a turbine section; and
an engine case wall surrounding the compressor section, the combustion section, and the turbine section, the engine case wall extending radially between an interior surface of the engine case wall and an exterior surface of the engine case wall, and the engine case wall comprising:
a first cavity, embedded within material of the engine case wall, defining an injector, wherein the injector is in fluid communication with the combustion section; and
a second cavity, embedded within the material the engine case wall, defining a fuel feed passage, wherein the fuel feed passage is in thermal communication with the exterior surface of the engine case wall through the material of the engine case wall.

2. The engine of claim 1, wherein the fuel feed passage is substantially parallel to the exterior surface of the engine case wall.

3. The engine of claim 1, wherein the injector includes an injector inlet and an injector outlet.

4. The engine of claim 3, further comprising a third cavity, embedded within the engine case wall, defining a fuel line, wherein the fuel line is connected to the fuel feed passage and wherein the fuel line is in fluid communication with the fuel feed passage.

5. The engine of claim 4, wherein the fuel feed passage is connected to the injector at the injector inlet and wherein the fuel feed passage is in fluid communication with the injector.

6. The engine of claim 5, wherein the fuel line extends around the engine case wall circumferentially and is connected to N number of fuel feed passages and is in fluid communication with N number of fuel feed passages.

7. The engine of claim 5, wherein the combustor section is connected to the injector outlet.

8. The engine of claim 1, wherein the engine case is formed of a nickel alloy.

9. The engine of claim 1, wherein
the combustor section includes a combustor and a combustor wall forming a radial outer boundary of the combustor; and
the engine case wall is separated from the combustor wall by an air channel.

10. An engine comprising:
a compressor section;
a combustion section comprising a combustor;
a turbine section; and
an engine case wall surrounding the compressor section, the combustion section, and the turbine section, the engine case wall spaced radially outboard from the combustor, and the engine case wall comprising:
a first cavity, embedded within the engine case wall, defining an injector, wherein the injector is in fluid communication with the combustion section; and
a second cavity, embedded within the engine case wall, defining a fuel feed passage, wherein the fuel feed passage is in thermal communication with an exterior surface of the engine case wall.

11. The engine of claim 10, wherein the fuel feed passage is substantially parallel to the exterior surface of the engine case wall.

12. The engine of claim 10, wherein the injector includes an injector inlet and an injector outlet.

13. The engine of claim 12, further comprising a third cavity, embedded within the engine case wall, defining a fuel line, wherein the fuel line is connected to the fuel feed passage and wherein the fuel line is in fluid communication with the fuel feed passage.

14. The engine of claim 13, wherein the fuel feed passage is connected to the injector at the injector inlet and wherein the fuel feed passage is in fluid communication with the injector.

15. The engine of claim 14, wherein the fuel line extends around the engine case wall circumferentially and is connected to N number of fuel feed passages and is in fluid communication with N number of fuel feed passages.

16. The engine of claim 12, wherein the combustor is connected to the injector outlet.

17. The engine of claim 10, wherein the engine case is formed of a nickel alloy.

18. The engine of claim 10, wherein
the combustor comprises a combustor wall; and an air channel extends radially between and is formed by the combustor wall and the engine case wall.

19. The engine of claim 10, wherein the engine case wall has a wall thickness that extends radially between an interior surface of the engine case wall and the exterior surface of the engine case wall; and the second cavity is embedded within the engine case wall radially between the interior surface of the engine case wall and the exterior surface of the engine case wall.

20. An engine, comprising:

a combustion section comprising a combustor; and an engine case wall housing the combustion section, the engine case wall comprising a fuel line, a fuel feed passage and an injector;

the fuel line extending circumferentially about an axis within material of the engine case wall;

the fuel feed passage extending axially within the material of the engine case wall, the fuel feed passage configured to direct fuel received from the fuel line to the injector; and the injector extending within the material of the engine case wall to an injector outlet, the injector configured to direct the fuel received from the fuel feed passage into the combustor through the injector outlet.

* * * * *